Patented June 8, 1926.

1,588,382

UNITED STATES PATENT OFFICE.

LUDWIG BENDA, OF MAINKUR, NEAR FRANKFORT-ON-THE-MAIN, AND WERNER SCHMIDT, OF FECHENHEIM, NEAR FRANKFORT-ON-THE-MAIN, GERMANY, ASSIGNORS TO I. G. FARBENINDUSTRIE AKTIENGESELLSCHAFT, A CORPORATION OF GERMANY.

N-ACYL DERIVATIVES OF 5-AMINO-3-CHLORO-4-HYDROXYBENZENE-1-ARSONIC ACID.

No Drawing. Application filed November 7, 1925, Serial No. 67,654, and in Germany March 10, 1924.

This application is in part a continuation of application Serial No. 13,454, filed March 6, 1925.

The new acyl acids, for instance the 5-acetylamino-3-chloro-4-hydroxybenzene-1-arsonic acid and the 5-benzoylamino-3-chloro-4-hydroxybenzene-1-arsonic acid possess excellent therapeutic properties. This is all the more remarkable as the known 3-chloro-4-hydroxybenzene arsonic acids, for instance the 3-chloro-4-hydroxy-5-chlorobenzene-1-arsonic acid, according to Ehrlich and Hata had altogether to be excluded from practical application owing to neurothropy.

*Example 1.*—5-acetylamino-3-chloro-4-hydroxybenzene-1-arsonic acid.

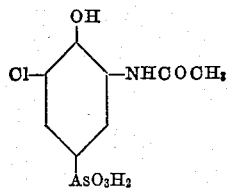

27.4 kilos sodium salt of the 3-chloro-4-hydroxybenzene-1-arsonic acid are stirred into 150 kg. sulfuric acid (66° Bé.) at 5–10° C.; at 0–3° C., 20.7 kilos nitric acid (containing 1/10 mol. $HNO_3$ are allowed to run in, the temperature being then raised up to 12° C.

This is stirred into 100 kilos water and 300 kilos ice, and the nitro compound, which separates in the form of slightly yellow crystals, is decanted after some time by suction.

Without previously drying, the paste is mixed with 100 litres water, 50 kilos ice and 60 kilos caustic soda solution 38° Bé. thereafter adding, while stirring 30–35 kilos hydrosulfite until decolorizing is complete.

The solution thus obtained is now neutralized with hydrochloric acid, and then at about 50° C. mixed with 21 kilos acetic anhydride while stirring well.

No diazotizable substance being left, the solution is rendered slightly alkaline with caustic soda, and evaporated down to near crystallizing point. It is cooled off, the grey-colored crystals which have precipitated are separated from the mother solution, dissolved in water, the solution is decolorized by means of animal charcoal, filtered, and the free acetamino-3-chloro-4-hydroxybenzene-1-arsonic acid is precipitated by the addition of hydrochloric acid; this compound crystallizes from hot water in the form of fine white small needles; it is sparingly soluble in cold water, methyl or ethyl alcohol, dissolves easily in hot water, dilute caustic alkalies and caustic alkali metal carbonates, insoluble in ether, benzene, carbon tetrachloride and ligroin.

*Example 2.*—5-benzoylamino-3-chloro-4-hydroxybenzene-1-arsonic acid.

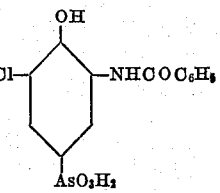

27.4 kilos sodium salt of the 3-chloro-4-hydroxybenzene-1-arsonic acid are stirred into 150 kg. sulfuric acid (66° Bé.) at 5–10° C.; at 0–3° C., 20.7 kilos nitric acid (containing 1/10 mol. $HNO_3$) are allowed to run in, the temperature being then raised up to 12° C.

This is stirred into 100 kilos water and 300 kilos ice, and the nitro compound, which separates in the form of slightly yellow crystals, is decanted after some time by suction.

Without previously drying, the paste is reduced with hydrosulfite and caustic alkali as described in Example 1.

The solution thus obtained is first neutralized with hydrochloric acid and after mixing with 250 litres caustic sodium carbonate solution double normal and cooling down, 30 kilos benzoylchloride are added in small portions while stirring until the presence of a diazotizable substance cannot be demonstrated any longer. The mass thickens to a magma of shining little leaves which represent the sodium salt of the new compound. After decanting by suction, dissolving in hot water the solution is filtered and the free acid precipitated by means of dilute hydrochloric acid. By recrystallizing from methyl alcohol it is obtained in the form of colorless small needles. These dissolve readily in alkalies and alkali metal carbonates, rather sparingly in sodium acetate solution, are however insoluble in dilute acids and practically insoluble in water and ether, but dissolve in hot methyl or ethyl alcohol. On cooling the alcoholic solution the compound recrystallizes as beautiful small needles.

Having now particularly described and ascertained the nature of our said invention and in what manner the same is to be performed, we declare, that what we claim is:—

1. As new products 5-acylamino-3-chloro-4-hydroxybenzene-1-arsonic acids of the formula

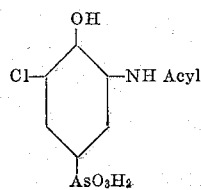

forming white scales, easily soluble in hot water, alkalies, sodium acetate and carbonate, sparingly in cold water, not soluble in ether and benzene.

2. As new product 5-acetylamino-3-chloro-4-hydroxybenzene-1-arsonic acid of the formula

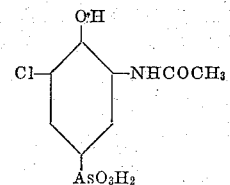

forming white scales, sparingly soluble in cold water, readily soluble in hot water, alkalies, sodium acetate and carbonate, not soluble in ether and benzene.

In witness whereof we have hereunto signed our names this 21st day of October, 1925.

LUDWIG BENDA.
WERNER SCHMIDT.